(12) United States Patent  
Kobayashi et al.

(10) Patent No.: US 8,349,511 B2
(45) Date of Patent: Jan. 8, 2013

(54) FUEL CELL

(75) Inventors: Ayano Kobayashi, Nagoya (JP); Shinji Fujisaki, Kuwana (JP); Makoto Ohmori, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/159,796

(22) Filed: Jun. 14, 2011

(65) Prior Publication Data

US 2011/0305972 A1    Dec. 15, 2011

(30) Foreign Application Priority Data

Jun. 15, 2010 (JP) .................... 2010-136371
Apr. 22, 2011 (JP) .................... 2011-096517

(51) Int. Cl.
 *H01M 8/12* (2006.01)
(52) U.S. Cl. ........................ 429/468; 429/496
(58) Field of Classification Search ............ 429/496, 429/468, 465; 427/113
See application file for complete search history.

(56) References Cited

U.S. PATENT DOCUMENTS

| | | |
|---|---|---|
| 6,492,051 B1 | 12/2002 | Gopalan et al. |
| 2006/0099473 A1 | 5/2006 | Hart et al. |
| 2006/0134492 A1* | 6/2006 | Hilchenko et al. ........... 429/33 |
| 2006/0156528 A1 | 7/2006 | Esaki |
| 2007/0190381 A1* | 8/2007 | Horiuchi et al. .............. 429/26 |
| 2008/0102337 A1* | 5/2008 | Shimada ....................... 429/30 |
| 2009/0176141 A1* | 7/2009 | Santurri et al. ............... 429/33 |

FOREIGN PATENT DOCUMENTS

| | | |
|---|---|---|
| EP | 2 061 108 A1 | 5/2009 |
| JP | 09-304321 A1 | 11/1997 |
| JP | 2005-022966 A1 | 1/2005 |
| JP | 2007-141492 A1 | 6/2007 |

\* cited by examiner

*Primary Examiner* — Jennifer K Michener
*Assistant Examiner* — Monique Wills
(74) *Attorney, Agent, or Firm* — Burr & Brown

(57) ABSTRACT

A fuel cell is provided that includes an anode, a cathode, a solid electrolyte layer, a barrier layer, and an intermediate layer. The solid electrolyte layer includes zirconium and is provided between the anode and the cathode. The barrier layer includes cerium and is provided between the solid electrolyte layer and the cathode. The intermediate layer includes zirconium and cerium, and has a first surface facing the solid electrolyte layer, a second surface facing the barrier layer, and pores. The pore ratio of the intermediate layer is higher than the pore ratio of the barrier layer.

13 Claims, 6 Drawing Sheets

FUEL CELL

CROSS-REFERENCE TO RELATED APPLICATIONS

This application claims priority under 35 U.S.C. §119 to Japanese Patent Application No. 2010-136371, filed on Jun. 22, 2010, and Japanese Patent Application No. 2011-96517, filed on Apr. 22, 2011. The entire disclosures of Japanese Patent Applications No. 2010-136371 and No. 2011-96517 is hereby incorporated herein by reference.

BACKGROUND OF THE INVENTION

1. Technical Field

The present invention relates to a fuel cell, and in particular, relates to a solid-oxide fuel cell.

2. Background Information

In recent years, fuel cells have attracted attention in light of effective use of energy resources and environmental problems. A fuel cell stack includes a fuel cell and an interconnector. Patent Literatures (see Japanese Patent Application Laid-Open No. 2007-141492, Japanese Patent Application Laid-Open No. 9-304321, Japanese Patent Application Laid-Open No. 2005-22966) disclose a fuel cell stack that includes a solid electrolyte layer, and an anode and a cathode that are opposed through the solid electrolyte layer.

SUMMARY OF THE INVENTION

A fuel cell that includes at least two layers having a different composition is associated with the disadvantage that the coefficient of thermal expansion and/or the firing contraction amount in the respective layers differs in response to heat produced during manufacture and/or use. More specifically, this disadvantage includes the production of a crack in one of the layers and peeling of one layer from the other layer as a result of a distortion caused by thermal stress.

The present invention is proposed in light of the above problems, and has the object of suppressing the production of such a disadvantage in a fuel cell.

A fuel cell according to an aspect of the present invention is provided that includes an anode, a cathode, a solid electrolyte layer, a barrier layer, and an intermediate layer. The solid electrolyte layer includes zirconium and is provided between the anode and the cathode. The barrier layer includes cerium and is provided between the solid electrolyte layer and the cathode. The intermediate layer includes zirconium and cerium, and has a first surface facing the solid electrolyte layer, a second surface facing the barrier layer, and pores. The pore ratio of the intermediate layer is higher than the pore ratio of the barrier layer.

The intermediate layer in the fuel cell according to the present invention includes pores, and therefore enables a reduction in the stress between the barrier layer and the solid electrolyte layer. As a result, peeling between the barrier layer and the solid electrolyte layer can be suppressed.

DETAILED DESCRIPTION OF THE INVENTION

A solid oxide fuel cell (SOFC) is an example of a fuel cell. In particular, the following description mainly relates to a SOFC that includes a cell-stack structure in which a plurality of fuel cells is stacked.

1. Vertically-Striped Fuel Cell 1-1 Overview of Fuel Cells Batteries

Figure 1:
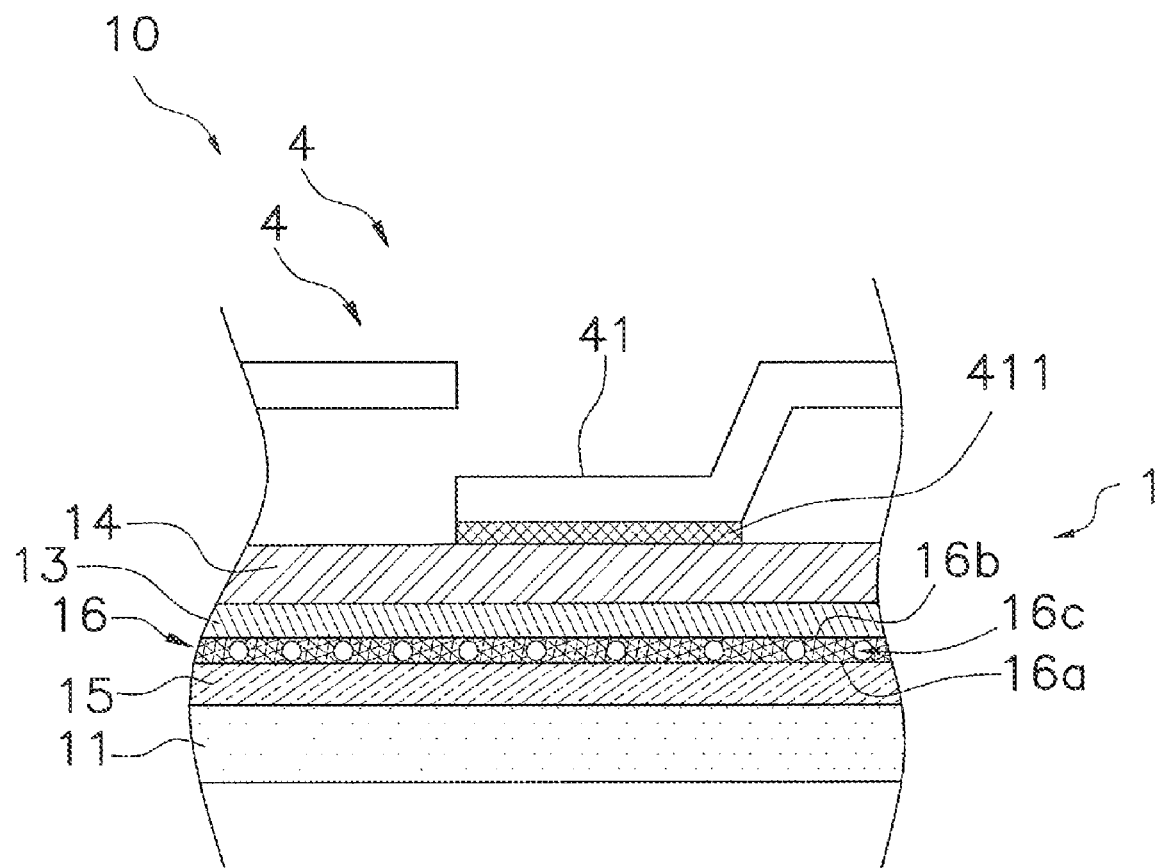
FIG. 1 is a cross sectional view illustrating the main components of a fuel cell stack.
Figure 1:
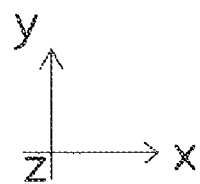

As illustrated in FIG. 1, a fuel cell stack 10 includes a fuel cell (simply termed a "cell") 1 and a current collecting member 4. Although the fuel cell stack 10 is a vertically-striped fuel cell, the present invention can also be applied to configurations other than a horizontally-striped configuration as described below. A plurality of cells 1 in the fuel cell stack 10 is stacked in the y-axis direction through the current collecting member 4. That is to say, the fuel cell stack 10 includes a plurality of stacked cells 1.

1-2 Overview of Cell 1

The cell 1 is a thin ceramic plate. The thickness of the cell 1 is for example 30 μm to 300 μm, and the diameter of the cell 1 is for example 5 mm to 50 mm. The cell 1 as illustrated in FIG. 1 includes an anode 11, a barrier layer 13, a cathode 14, an electrolyte layer 15, and an intermediate layer 16.

1-3 Anode

The material used in the anode 11 for example includes a material used in the anode in a known fuel cell. More specifically, the material used in the anode 11 may include NiO—YSZ (nickel oxide-yttria-stabilized zirconia) and/or NiO—$Y_2O_3$ (nickel oxide-yttria). The anode 11 may include these materials as a main component. Furthermore, the anode 11 may function as a base plate (in other words, a support body) that supports the other layers included in the cell 1. That is to say, the thickness of the anode 11 may represent the maximum thickness in the plurality of layers contained in the cell 1. More specifically, the thickness of the anode 11 is of the order of 10 μm to 300 μm. The anode 11 can be imparted conductive properties by application of a reduction treatment (for example, a treatment of reducing NiO to Ni).

The term "composition A includes material B as a main component" preferably means that the content of material B in composition A is at least 60 wt %, and still more preferably, means that the content of material B in composition A is at least 70 wt %.

The anode 11 may include at least two layers. For example, the anode 11 may have two layers, that is to say, a base plate and an anode-active layer (fuel side electrode) formed thereon. The material in the base plate and the anode-active layer may be selected from the materials for the anode 11 as described above. More specifically, a combination may be used in which the base plate is formed from NiO—$Y_2O_3$ and the anode-active layer is formed from NiO—YSZ.

1-4 Barrier Layer

The barrier layer 13 is provided between the cathode 14 and the anode 11, and more specifically, is provided between the cathode 14 and the electrolyte layer 15.

The barrier layer 13 includes cerium. The barrier layer may include cerium as the ceria (cerium oxide). More specifically, materials that are used in the barrier layer 13 include ceria and ceria-based materials including rare-earth metal oxides configured as a solid solution into ceria. The barrier layer 13 may include a ceria-based material as a main component. More specifically, the ceria-based material includes GDC ((Ce, Gd)O$_2$: gadolinium doped ceria), SDC ((Ce, Sm)O$_2$: samarium doped ceria). For example, the mol composition ratio of the rare earth metal oxide to ceria may be 5 to 95-20 to 80. The barrier layer 13 may include additives in addition to a ceria-based material.

The thickness of the barrier layer 13 for example may be 40 μm or less, may be 30 μm or less, or may be 20 μm or less.

The barrier layer 13 suppresses formation of a high resistance layer by suppressing the diffusion of cations from the cathode 14 into the electrolyte layer 15. As a result, the barrier layer 13 enables suppression of a reduction in the output density, and increases the product life of the cell 1.

The barrier layer 13 includes pores, and the pore ratio of the barrier layer 13 is preferably less than the pore ratio of the intermediate layer 16. More specifically, the pore ratio of the barrier layer 13 is preferably 10% or less. The effect of suppressing cation diffusion by the barrier layer 13 is enhanced by providing the barrier layer 13 in a dense configuration. Furthermore the electrical resistance value of the cell 1 is suppressed to a low value by providing the barrier layer 13 in a dense configuration. The pore ratio of the barrier layer 13 is calculated in the same manner as the pore ratio of the intermediate layer 16 as described below.

1-5 Cathode

A cathode material for a known fuel cell is used as the material of the cathode 14. More specifically, the material in the cathode 14 includes LSCF (lanthanum strontium cobalt ferrite: (LaSr)(CoFe)O$_3$).

The composition of LSCF for example includes La$_{0.6}$Sr$_{0.4}$Co$_{0.2}$Fe$_{0.8}$O$_3$. The cathode 14 may include the above materials as a main component. The thickness of the cathode 14 may be of the order of 5 μm-50 μm.

1-6 Electrolyte Layer

The electrolyte layer 15 is an example of a solid electrolyte layer, and is provided between the barrier layer 13 and the anode 11.

The electrolyte layer 15 includes zirconium. The electrolyte layer 15 may include zirconium in the form of zirconia (ZrO$_2$). More specifically, the electrolyte layer 15 may include zirconia as a main component. The electrolyte layer 15 may include an additive such as Y$_2$O$_3$ and/or Sc$_2$O$_3$ in addition to zirconia. These additives may function as a stabilizer. In the electrolyte layer 15, the mol composition ratio of the stabilizer to zirconia may be 3 to 97-20 to 80. In other words, the material used in the electrolyte layer 15 includes zirconia-based materials such as yttria-stabilized zirconia including 3YSZ, 8YSZ, and 10YSZ, and ScSZ (scandia-stablized zirconia) or the like.

The thickness of the electrolyte layer 15 may be 30 μm or less.

The pore ratio of the electrolyte layer 15 is preferably less than the pore ratio of the intermediate layer 16, and preferably less than the pore ratio of the barrier layer 13. More specifically, the pore ratio of the electrolyte layer 15 may be 7% or less, or 5% or less, or 3% or less. The pore ratio of the electrolyte layer 15 is calculated in the same manner as the pore ratio of the intermediate layer 16 as described below.

1-7 Intermediate Layer

The intermediate layer 16 is disposed between the barrier layer 13 and the electrolyte layer 15. More specifically, the intermediate layer 16 includes a first surface 16a and a second surface 16b. The first surface 16a is in contact with the electrolyte layer 15, and the second layer 16b is in contact with the barrier layer 13. The intermediate layer 16 shows an pore ratio that is higher than barrier layer 13.

The barrier layer 13, the electrolyte layer 15, and the intermediate layer 16 may be co-fired.

Pores

The intermediate layer 16 includes a plurality of pores 16c. There is no limitation on the shape of the pores 16c, and the cross sectional shape of the pores 16c may be substantially oval (including circular). The major-axis diameter R of the pore 16c preferably satisfies the relationship R≦1 μm, and the major-axis diameter R preferably satisfies the relationship 0.05 μm≦R.

The pore ratio P of the intermediate layer 16 preferably satisfies the relationship P≦15%, and the pore ratio P of the intermediate layer 16 preferably satisfies the relationship 1%≦P. The pore ratio may be expressed as a space ratio. Although the pore ratio P is expressed by the ratio of the volume V2 of the space (including the pores 16c) with respect to the total volume V1 of the intermediate layer 16 (V2/V1), it may be expressed as the surface area of the pores 16c per unit area in cross section of the first barrier layer.

The pore ratio P for example is acquired by
  acquiring a scanning electron microscope (SEM) image in cross section with respect to the thickness dimension of the intermediate layer 16,
  specifying the pores 16c in the image (field of vision),
  acquiring the surface area of the intermediate layer 16 in the image,
  acquiring the sum of the surface area of the pores 16c in the image, and
  calculating "the sum of the surface area of the pores 16c divided by total surface area of the intermediate layer 16" in the image.

More specifically, a SEM and FE-SEM or the like may be used to acquire the cross-sectional image, and thereafter, image analysis software or the like may be used in numerical conversion of the surface area of the pores.

The pore ratio that is calculated in one field of vision may be taken as the pore ratio of the entire intermediate layer, or the pore ratio may be calculated using the same procedure for a plurality of fields of vision, and an average value may be taken to be the pore ratio of the whole intermediate layer.

In the intermediate layer 16, the number of pores per 10 μm length with respect to a direction that is parallel to the interface direction between layers is preferably 5 or less, in the sectional face that is parallel to the thickness dimension of the intermediate layer 16.

Since the composition of the barrier layer 13 is different from the composition of the electrolyte layer 15, the coefficient of thermal expansion and firing contraction amount of the barrier layer 13 is different from the coefficient of thermal expansion and firing contraction amount of the electrolyte layer 15. Since the barrier layer 13 and the electrolyte layer 15 are fired in a stacked configuration during manufacture of the cell 1, a distortion is formed in an inner portion of the barrier layer 13 and the electrolyte layer 15. The cell 1 is then subjected to a high temperature during operation, and returns to an ambient temperature during a non-operational period. When the barrier layer 13 and the electrolyte layer 15 repetitively shift between an ambient temperature state and a high temperature state when a distortion is present, peeling may result on the interface between the barrier layer 13 and the electrolyte layer 15 as a result of the distortion. The intermediate layer 16 mitigates the distortion and thereby enables suppression of peeling by inclusion of the pores 16c.

At least a portion of the pores 16c included in the intermediate layer 16 may be closed pores. Furthermore all of the pores 16c contained in the intermediate layer 16 may be closed pores. The closed pores may be disposed in the cell 1, that is to say, in the intermediate layer 16, and the inner portion of the closed pores may be isolated from the outer air of the cell 1. The inclusion of closed pores in the intermediate layer 16 enables the intermediate layer 16 to exhibit an effect that substantially mitigates the distortion, that is to say, an effect that substantially mitigates thermal stress. Furthermore, even when a crack is generated in the intermediate layer 16, the inclusion of closed pores suppresses increase in crack width.

Composition

The intermediate layer 16 includes zirconium and cerium. The zirconium and cerium may be in the form of ceria and zirconia in the intermediate layer 16. The zirconium (or zirconia) and cerium (or ceria) in the intermediate layer 16 may be mixed, and the intermediate layer 16 is preferably a solid solution of ceria and zirconia. The intermediate layer 16 may include a material other than cerium and zirconium. The intermediate layer 16 may include for example a material (additive or the like) that is included in the barrier layer 13 or the electrolyte layer 15. When the electrolyte layer 15 contains yttrium (Y), the intermediate layer 16 also contains yttrium. When the barrier layer 13 includes gadolinium (Gd), the intermediate layer 16 also contains gadolinium.

Concentration of Cerium and Concentration of Zirconium

In the intermediate layer 16, the cerium concentration $D1$ and the zirconium concentration $D2$ ($D2/D1$) may satisfy (1) to (8) below.

(1) The ratio of zirconium concentration $D2$ relative to the cerium concentration $D1$ ($D2/D1$) is preferably $0.1 \leq D2/D1$.
(2) $D2/D1$ preferably satisfies $D2/D1 \leq 1$.
(3) The concentration $D1$ of cerium preferably satisfies $D1 \leq 80$ mol %.
(4) The concentration $D1$ preferably satisfies $40$ mol % $\leq D1$.
(5) The concentration $D2$ of zirconium preferably satisfies $D2 \leq 50$ mol %.
(6) The concentration $D2$ of zirconium preferably satisfies $10\% \leq D2$.
(7) The ratio ($D1/D3$) of the concentration $D1$ of cerium in the intermediate layer 16 relative to the concentration $D3$ of cerium in the barrier layer 13 may satisfy $D1/D3 \leq 0.9$.
(8) The ratio ($D2/D4$) of the concentration $D2$ of zirconium in the intermediate layer 16 relative to the concentration $D4$ of zirconium in the electrolyte layer 15 may satisfy $D2/D4 \leq 0.5$.

Any one of the conditions in conditions (1) to (8) may be satisfied, or two or more conditions may be satisfied.

Furthermore, in the absence of a specific limitation on the "concentration" of the components in each layer discussed in this document and the concentrations $D1$ to $D4$, it is the concentration in each overall layer, that is to say, the average content amount of a component (for example, zirconium or cerium and so on) in each layer.

More specifically, "concentration" is obtained by line analysis using a atomic concentration profile, that is to say, it is obtained by a comparison between the characteristic X-ray intensity using an EPMA (electron probe micro analyzer).

Quantitative analysis using EPMA is known to a person skilled in the art. EPMA is an apparatus that detects and identifies the component elements in a minute region (approximately 1 µm$^3$) onto which an electron beam is illuminated based on the characteristic X-ray spectrum that is irradiated by illumination of an electron beam onto a target object, and then analyzes the ratio (concentration) of each component element. Quantitative analysis using EPMA is executed by comparison of the characteristic X-ray intensity of a reference test material that has a clear element concentration and a characteristic X-ray intensity of an unknown test material.

In other words, concentration distribution data for each element is acquired by line analysis with respect to a thickness dimension (y direction) using EPMA in a cross section that is substantially parallel to the thickness dimension (y axial direction) in the cell 1.

That is to say, the concentration $D1$-$D4$ can be determined by element mapping using an EPMA (electron problem micro analyzer).

In the present specification, EPMA is a concept that includes EDS (energy dispersive x-ray spectroscopy).

Specification of First Surface and Second Surface

The first surface 16a can be specified as described hereafter with reference to a cross section of a cell 1 that is substantially parallel to the thickness dimension (y axial direction). In other words, when the position of the first surface 16a is determined, the concentration distribution data for each element can be acquired by executing a line analysis in the layer thickness dimension (y direction) using EPMA in a cross section that has a substantially parallel thickness dimension (y direction). This concentration distribution data can be used to determine the position of the line that corresponds with the concentration of cerium and the concentration of zirconium as the position of the first surface 16a.

That is to say, the concentration of zirconium and the concentration of cerium is substantially the same in proximity to the first surface 16a.

The position of the second surface 16b is specified as the position of the line that demonstrates 85% concentration of the maximum concentration of cerium in the cross section.

Component Concentration Distribution

The distribution of the cerium concentration and the zirconium concentration in the intermediate layer 16 may satisfy the conditions (a) to (e) below.

(a) The intermediate layer 16 preferably includes a cerium concentration gradient. The horizontal axis of the graph showing the included cerium concentration gradient shows the distance from the second surface 16b to the portion at an arbitrary position in the intermediate layer 16, the maximum distance value is the distance from the second surface 16b to the first surface 16a. The vertical axis shows the cerium concentration in that portion. The graph preferably exhibits a monotonic decrease in the cerium concentration in response to an increase in the distance.

That is to say, when the concentration gradient is present, and if the intermediate layer 16 is divided into a plurality of portions in a cross section that is parallel to the first surface 16a, the portion that is in proximity to the second surface 16b in the intermediate layer 16 shows a tendency to have a higher cerium concentration than a portion in proximity to the first surface 16a in the intermediate layer 16.

(b) The cerium concentration in a portion that is positioned in proximity to the second surface 16b in a portion of the intermediate layer 16 preferably is close to the cerium concentration of the barrier layer 13. More specifically, the cerium concentration of the portion that is positioned in proximity to the second surface 16b and is a portion of the intermediate layer 16 is preferably substantially the same as the cerium concentration in a portion that is positioned in proximity to the second surface 16b and is a portion of the barrier layer 13.

(c) The intermediate layer 16 is preferably includes a zirconium concentration gradient. The horizontal axis of the graph illustrating the zirconium concentration gradient shows the distance from the second surface 16b in the same manner as the graph in (a) above. When the vertical axis shows the zirconium concentration, the zirconium concentration in this graph preferably increases in a monotonic manner substantially in response to the increase in the distance.

(d) The zirconium concentration of the position in proximity to the first surface 16a and is a portion of the intermediate layer 16 is preferably close to the zirconium concentration of the electrolyte layer 15. More specifically, the zirconium concentration of the portion that is positioned in proximity to the first surface 16a and is a portion of the intermediate layer 16 is preferably substantially the same as the zirconium concentration in a portion that is positioned in proximity to the first surface 16a and is a portion of the electrolyte layer 15.

Any one of the conditions in conditions (a) to (d) may be satisfied, or two or more conditions may be satisfied. The greater a number of conditions is satisfied, the more it is preferred.

For example, when (a) to (d) are satisfied, the cell 1 has a concentration gradient that shows a gradually decreasing cerium concentration and a gradually increasing zirconium concentration from the lower surface of the barrier layer 13 to the upper surface of the electrolyte layer 15.

In the region from the barrier layer 13 to the electrolyte layer 15, the result is obtained that peeling between the barrier layer 13 and the electrolyte layer 15 is prevented by the gradual variation in the composition in response to the distance from the barrier layer 13 (this may also be expressed as the distance from the electrolyte layer 15).

The cerium concentration and the zirconium concentration in (a) to (d) above may be a value that is obtained by line analysis using EPMA.

Thickness

The thickness of the intermediate layer 16, that is to say, the distance from the first surface 16a to the second surface 16b is preferably at least 0.5 μm and preferably no more than 10 μm. The thickness of the intermediate layer 16 is more preferably no more than 5 μm.

Coefficient of Thermal Expansion

The coefficient of thermal expansion (that is to say, the coefficient of linear expansion) of the intermediate layer 16 is a value between the coefficient of thermal expansion of the electrolyte layer 15 and the coefficient of thermal expansion of the barrier layer 13. In other words, when the coefficient of thermal expansion of the barrier layer 13 is higher than the coefficient of thermal expansion of the electrolyte layer 15, the coefficient of thermal expansion of the intermediate layer 16 is higher than the electrolyte layer 15, and lower than the coefficient of thermal expansion of the barrier layer 13. For example, the coefficient of thermal expansion of the intermediate layer 16 may be greater than the coefficient of thermal expansion of YSZ that is an example of the electrolyte layer 15, and smaller than the coefficient of thermal expansion of GDC that is an example of the barrier layer 13.

1-8 Other Cell Configurations

The fuel cell may include an anode, an electrolyte layer and a cathode. That is to say, the cell 1 as described above is merely an example of a fuel cell. Thus in the cell 1, further additions of component elements, or variation to the shape, material and dimensions or the like of the component elements in the cell 1 are possible. For example, in the cell 1, a layer in addition to the layers described above may be further provided between the anode 11 and the electrolyte layer 15 and/or the cathode 14 and the barrier layer 13.

For example, a second barrier layer may be further provided between the barrier layer 13 and the cathode layer 14.

Figure 4:
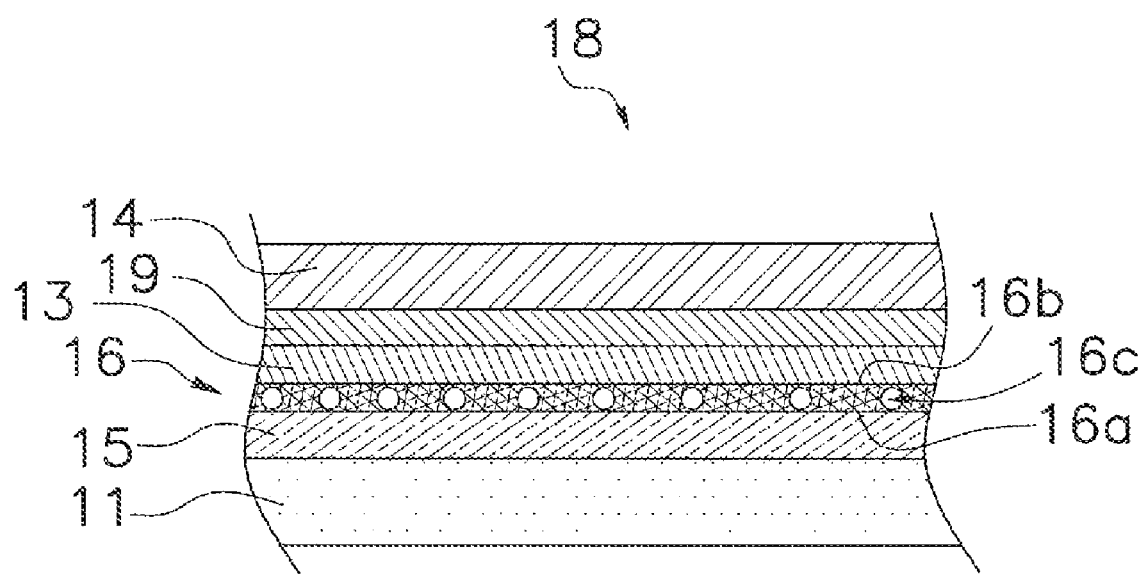
FIG. 4 is a cross sectional view of a fuel cell including a second barrier layer.

FIG. 4 shows the fuel cell (hereinafter simply referred to as a "cell") 18 that includes a second barrier layer. In FIG. 4, those component elements that are the same as the component elements in the cell illustrated in FIG. 1 are denoted by the same reference numbers and the corresponding description will not be repeated.

As illustrated in FIG. 4, the cell 18 includes the barrier layer 13 as a first barrier layer, and a second barrier layer 19 that is provided between the barrier layer 13 and the cathode 14. The material that configures the second barrier layer 19 may be the same material as the barrier layer 13. Furthermore the density of the second barrier layer 19 may be lower than the density of the first barrier layer 13. In other words, the second barrier layer 19 includes pores, and the pore ratio of the second barrier layer 19 may be greater than the pore ratio of the first barrier layer 13.

The configuration of the fuel cell may be varied in the following manner.

(1) The shape of the cell may include an anode-supporting configuration, a flat-plate configuration, a cylindrical configuration, a vertically-striped configuration, a segmented-in-series configuration, a single-end support stack configuration or a double-end support stack configuration. The cross sectional surface of the cell may be oval.

(2) In another configuration, the anode in the cell 1, 18, 110 as described above may be provided on an outer side of the cell, and the cathode may be provided on an inner side.

(3) A configuration in another aspect is possible by combination of the above.

1-9 Current Collecting Member

A current collecting pore (not shown) and a conductive connection portion 41 are provided in the current collecting member 4. A plurality of conductive connection portions 41 are provided in the current collecting member 4.

As illustrated in FIG. 1, the conductive connection portions 41 are configured as an indented portion provided in the current collecting member 4, and the bottom portion thereof is connected through a conductive adhesive 411 to the cathode 14. As illustrated in FIG. 1, a non-connected position is provided between the conductive connection portions 41 and its periphery in the current collecting member 4. In that manner, as described hereafter, air is supplied to the cathode 14.

During power generation, fuel gas is supplied to the anode 11. The supply of air to the cathode 14 draws air from the side surface of the cell stack structure (the front of the face of the page in FIG. 1).

Although this is not shown, the fuel cell 10 further includes a member such as a lead that sends a current generated by the cell stack to an external apparatus and a gas reforming unit that includes an enzyme or the like for reforming the fuel gas.

2. Segmented-in-Series Fuel Cell

The fuel cell 10 described above includes a plurality of stacked cells 1 and a current collecting member 4 connecting the cells 1 electrically. In other words, the fuel cell 10 is a vertically-striped fuel cell. However, the present invention may also be applied to a segmented-in-series fuel cell. A segmented-in-series fuel cell will be described below.

Figure 5:
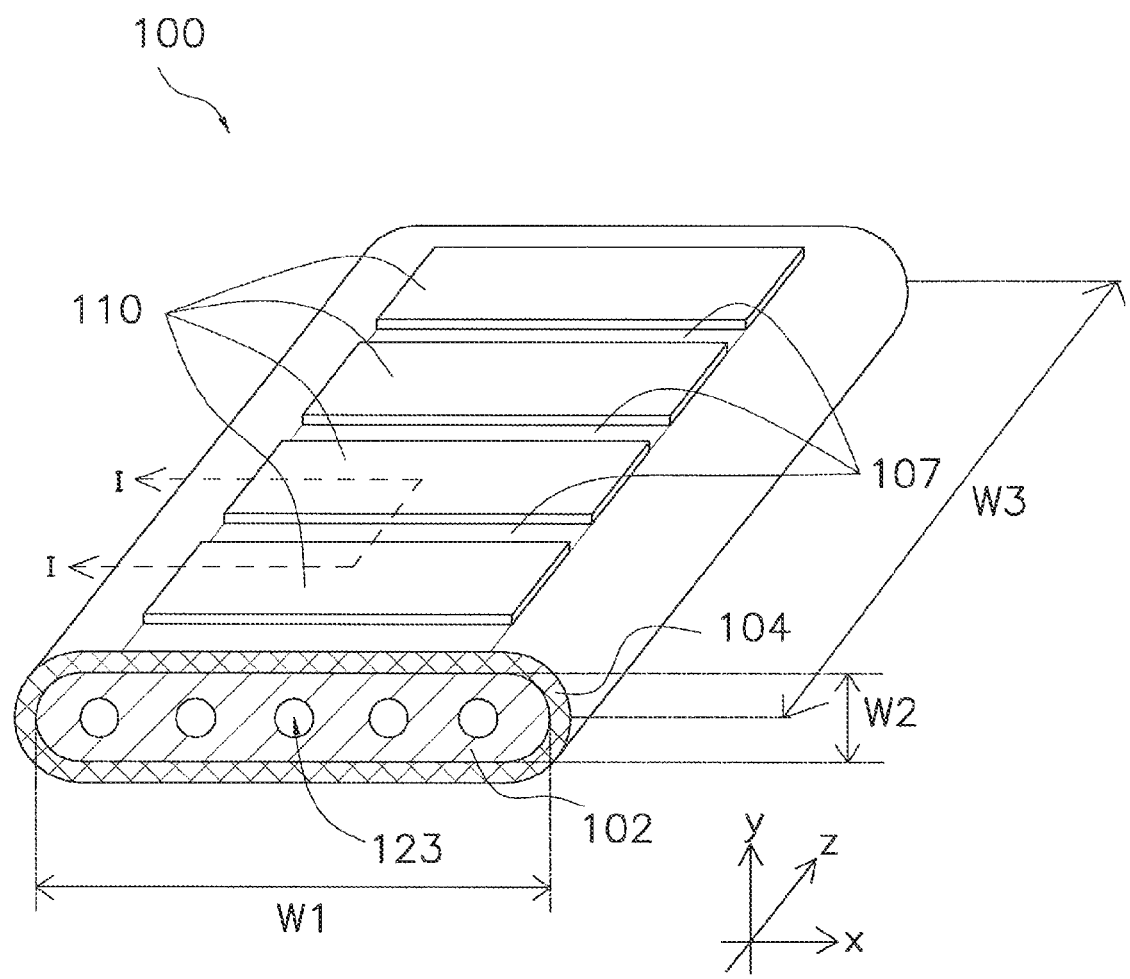
FIG. 5 is a perspective view illustrating the outer appearance of a segmented-in-series fuel cell.

The segmented-in-series fuel cell (hereinafter simply referred to as a "fuel cell") 100 includes a support base plate 102, an anode 103, an electrolyte layer 104, a cathode 106, an interconnector 107, a current collector 108, a barrier layer 13 and an intermediate layer 16. The fuel cell 100 includes a cell 110. Those component elements that are the same as the component elements already described above are denoted by the same reference numerals, and such description will not be repeated. In FIG. 5, for sake of convenience of description, the current collector 108 is not illustrated.

The fuel cell 100 includes a plurality of cells 110 disposed on the support base plate 102 and an interconnector 107 that is electrically connected between the cells 110. The cells 110 include an anode 103 and a cathode 106 that corresponds to the anode 103. More specifically, the cell 110 includes an anode 103, an electrolyte layer 104 and a cathode 106 stacked with reference to the thickness direction (y axis direction) of the support base plate 102.

The support base plate 102 is flat and elongated in one direction (z axis direction). The support base plate 102 is a porous body that has insulating properties. The support base plate 102 may include nickel. More specifically, the support base plate 102 may contain Ni—$Y_2O_3$ (nickel yttria) as a main component. The nickel may be included as an oxide (NiO). During power generation, NiO may be reduced to N by oxygen gas.

Figure 6:
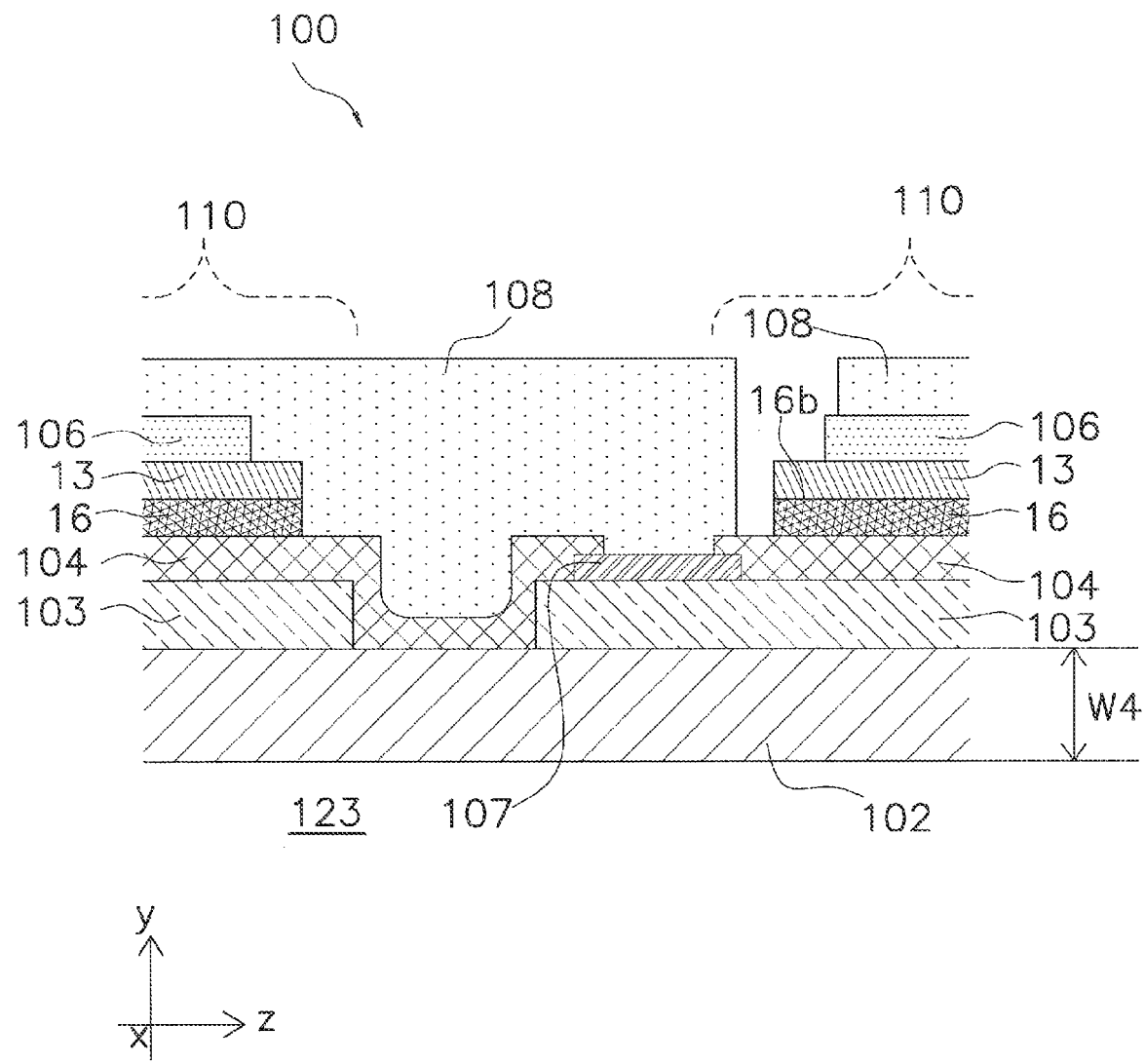
FIG. 6 is a cross sectional view along the arrow I-I of the segmented-in-series fuel cell in FIG. 5.

As illustrated in FIG. 5 and FIG. 6, a flow path 123 is provided in an inner portion of the support base plate 102. The flow path 123 extends along the longitudinal direction (z axis direction) of the support base plate 102. During power generation, fuel gas flows into the flow path 123, through the hole that is provided in the support base plate 102 to thereby supply fuel gas to the anode 103 described below.

The anode 103 is provided on the support base plate 102. A plurality of anodes 103 is disposed on a single support base plate 102 and arranged in the longitudinal direction (z axial direction) of the support base plate 102. That is to say, a space is provided between adjacent anodes 103 in the longitudinal direction (z axis direction) of the support base plate 102.

The composition of the anode 103 may be the same as the composition of the anode 11. The anode 103 may include an anode current collecting layer and an anode active layer. The anode current collecting layer is provided on the support base plate 102, and the anode active layer is provided to avoid superimposition with respect to the interconnector 107 on the anode current collecting layer.

The anode 103 may include an anode current collecting layer and an anode active layer. The anode current collecting layer is provided on the support base plate 102 and the anode active layer is provided on the anode current collecting layer. The composition of the anode current collecting layer and the anode active layer has been described above.

The electrolyte layer 104 is also termed a solid electrolyte layer. As illustrated in FIG. 6, the electrolyte layer 104 is provided on the anode 103. In a region that is not provided with the anode 103 on the support base plate 102, the electrolyte layer 104 may be provided on the support base plate 102.

The electrolyte layer 104 includes a non-connected position in the longitudinal direction (z axis direction) of the support base plate 102. In other words, a plurality of electrolyte layers 104 is disposed at an interval in the z axis direction. Namely, the plurality of electrolyte layers 104 are provided along the longitudinal direction (z axis direction) of the support base plate 102.

Electrolyte layers 104 adjacent in the z axis direction are connected by an interconnector 107. In other words, the electrolyte layers 104 are provided to be connected from an interconnector 107 to an interconnector 107 that is adjacent to that interconnector 107 in the longitudinal direction (z axis direction) of the support base plate 102. The interconnector 107 and the electrolyte layer 104 have a dense structure in comparison to the support base plate 102 and the anode 103. Therefore, the interconnector 107 and the electrolyte layer 104 function as a seal portion that partitions air and fuel gas by the provision of a connected structure in the z axis direction in the fuel cell 100.

The composition of the electrolyte layer 104 includes a composition that is the same as the electrolyte layer 15 as described above.

The same description provided in relation to the segmented-in-series fuel cell applies to the configuration of the barrier layer 13 and the intermediate layer 16.

The intermediate layer 16 is provided on the electrolyte layer 104. In FIG. 6, the intermediate layer 16 is not provided at a position without the electrolyte layer 104. That is to say, one intermediate layer 16 is provided corresponding to one anode 103.

The barrier layer 13 is provided between the intermediate layer 16 and the cathode 106.

The cathode 106 is disposed on the barrier layer 13 without projecting from the outer edge of the barrier layer 13. One cathode 106 is stacked on one anode 103. That is to say, a plurality of cathodes 106 are provided along the longitudinal direction (z axis direction) of the support base plate 102 on a single support base plate 102.

The composition of the cathode 106 includes the composition of the cathode 14 as described above.

As described above, the interconnector 107 may be disposed to configure electrical contact between the cells 110. In FIG. 6, the interconnector 107 is stacked onto the anode 103. The interconnector 107 may be directly connected onto the anode 103.

In the present specification, "stack" includes the disposition of two elements in connection and a disposition that provides an overlap in the y axis direction although there is not a connection.

In FIG. 6, as described above, the interconnector 107 is disposed to connect the electrolyte layers 104 in the longitudinal direction (z axis direction) of the support base plate 102. In this manner, cells 110 that are adjacent in the longitudinal direction (z axis direction) of the support base plate 102 are electrically connected.

The interconnector 107 is a dense layer in comparison to the support base plate 102 and the anode 103. The interconnector 107 contains a perovskite composite oxide as a main component. In particular, a chromite-based material is an example of a perovskite composite oxide.

The current collector 108 is disposed to electrically connect the interconnector 107 and the cell 110. More specifically, the current collector 108 provides a connection from the cathode 106 to the interconnector 107 included in a cell 110 that is adjacent to a cell 110 with the cathode 106. The current collector 108 may have conductive properties, and for example, may be configured from the same material as the interconnector 107.

A layer that contains at least one type of element of the elements that configure the anode 103 and at least one element of the elements that configure the interconnector 107 may be disposed between the anode 103 and the interconnector 107.

The cathode 106 contained in the cell 110 is electrically interconnected with the anode 103 of the adjacent cell 110 by the current collector 108 and the interconnector 107. That is to say, in addition to the interconnector 107, the current collector 108 also may participate in the connection between the cells 110. This configuration is also included in the configuration of "the interconnector is electrically connected between the cells".

More specifically, the dimensions of each portion of the fuel cell 100 may be set as described hereafter.

Width W1 of Support Base Plate 102: 1-10 cm
Thickness W2 of Support Base Plate 102: 1-10 mm
Length W3 of Support Base Plate 102: 5-50 cm Distance W4 from outer surface of Support Base Plate 102 (interface between the support base plate 102 and the anode) to Flow path 123: 0.1-4 mm Thickness of Anode 103: 50-500 µm (When the anode 103 includes an anode current collecting layer and an anode active layer:

Thickness of anode current collecting layer: 50-500 µm

Thickness of anode active layer: 5-30 µm)

Thickness of electrolyte layer 104: 3-50 µm

Thickness of cathode 106: 10-100 µm

Thickness of interconnector 107: 10-100 µm

Thickness of current collector 108: 50-500 µm

Dimensions that were described in relation to the segmented-in-series fuel cell may be adopted in relation to component elements that have not been mentioned in particular. Naturally, the present invention is not limited by the above values.

The fuel cell according to the various aspects described making reference to FIG. 4 may respectively be applied to a segmented-in-series fuel cell.

3. Method of Manufacture

The method of manufacture as described below is merely exemplary of the method of manufacture of the cell 1. In other words, the various conditions in relation to the devices used, the time, temperature, pressure, and materials as described above may be varied.

The anode 11 may be formed by stacking a plurality of ceramic green sheets and applying thermo-compression bonding. The ceramic green sheet that configures the anode 11 for example may be formed from nickel oxide (NiO), zirconium-based materials (for example, 8YSZ), and a pore forming agent (for example, PMMA poly(methyl methacrylate resin).

The method of manufacturing the cell 1 includes a step of forming the intermediate layer 16. In other words, the method of manufacturing the cell 1 includes a step of forming a layer that includes cerium and zirconium and pores. This step may be realized by a step of stacking the layer that includes a zirconium-based material as a main component (zirconia-based material layer) and a layer that includes a ceria-based material as a main component (ceria-based material layer), and a step of co-firing the stacked layers. A solid solution of ceria and zirconia is formed in the contact surface between the ceria-based material layer and the zirconia-based material layer as a result of the co-firing. Furthermore, an intermediate layer 16 including pores is formed by co-firing.

The method of forming the intermediate layer 16 is not limited to the above method, and for example, formation is also possible by stacking a material that has an adjusted concentration of cerium and zirconium.

The step of forming the barrier layer 13 includes a step of forming a ceria-based material layer. The step of forming the electrolyte layer 15 includes a step of forming a zirconia-based material layer. The respective layers may include an additive in addition to a ceria-based material layer and a zirconia-based material layer.

The step of forming the ceria-based material layer may include the stacking of a ceramic green sheet that includes a ceria-based material with another layer (for example, a zirconia-based material layer, or a material layer forming the intermediate layer). The step of forming the zirconia-based material layer may include the stacking of a ceramic green sheet that includes a zirconia-based material with another layer (for example, the anode 11). The stacked material layer is contact bonded with the other layer using a method such as CIP (cold isostatic press) or thermo-compression bonding.

In addition to stacking of a ceramic green sheet, the ceria-based material layer and the zirconia-based material layer may form one or both of the barrier layer 13 and the electrolyte layer 15 using another method such as a slurry dip method, a brush coating method, a stamping method and/or a printing method.

The precise flow of the manufacturing method will now be described.

A stacked body can be obtained by stacking in order, a zirconia-based material layer and a ceria-based material layer on a material layer forming the anode 11. A fired member can be obtained by degreasing and firing the laminated body. The firing forms the zirconia-based material layer into the electrolyte layer 15, and forms the ceria-based material layer into the barrier layer 13. An intermediate layer 16 is formed between the zirconia-based material layer and the ceria-based material layer.

Next, a cathode 14 is formed on the fired body. The cathode 14 is formed by firing after imparting the fired body with a cathode material using a printing method or the like. The above series of steps completes the cell 1.

Examples

A. Preparation of the Cell Test Material

A ceramic green sheet (thickness 100 µm) formed from nickel oxide (NiO), a zirconia-based material (8YSZ), and a pore forming agent (PMMA) are stacked to 300 µm, and then integrated by thermo-compression bonding (60° C., 3 MPa).

The resulting stacked body includes a separately manufactured ceramic green sheet that is formed from 3YSZ and a ceramic green sheet that is formed from GDC that are stacked in order and subjected to thermo-compression bonding. In this manner, a stacked body is obtained by sequential stacking of the anode, the zirconia-based material layer and the ceria-based material layer.

The resulting stacked body is co-fired at 1300-1500° C. for 1-20 hours.

Thereafter an LSCF film (30 µm) is applied to the ceria-based material layer (barrier layer) as a cathode and fired for two hours at 1000-1150° C.

A cell test material is prepared by the above operations.

B. Observation of Cross Section

The test material obtained in the above step A is cut vertically with respect to the direction of layer thickness. An image of the resulting cross section is observed using SEM-EDS (scanning electron microscopy-energy dispersive x-ray spectroscopy).

Figure 2:
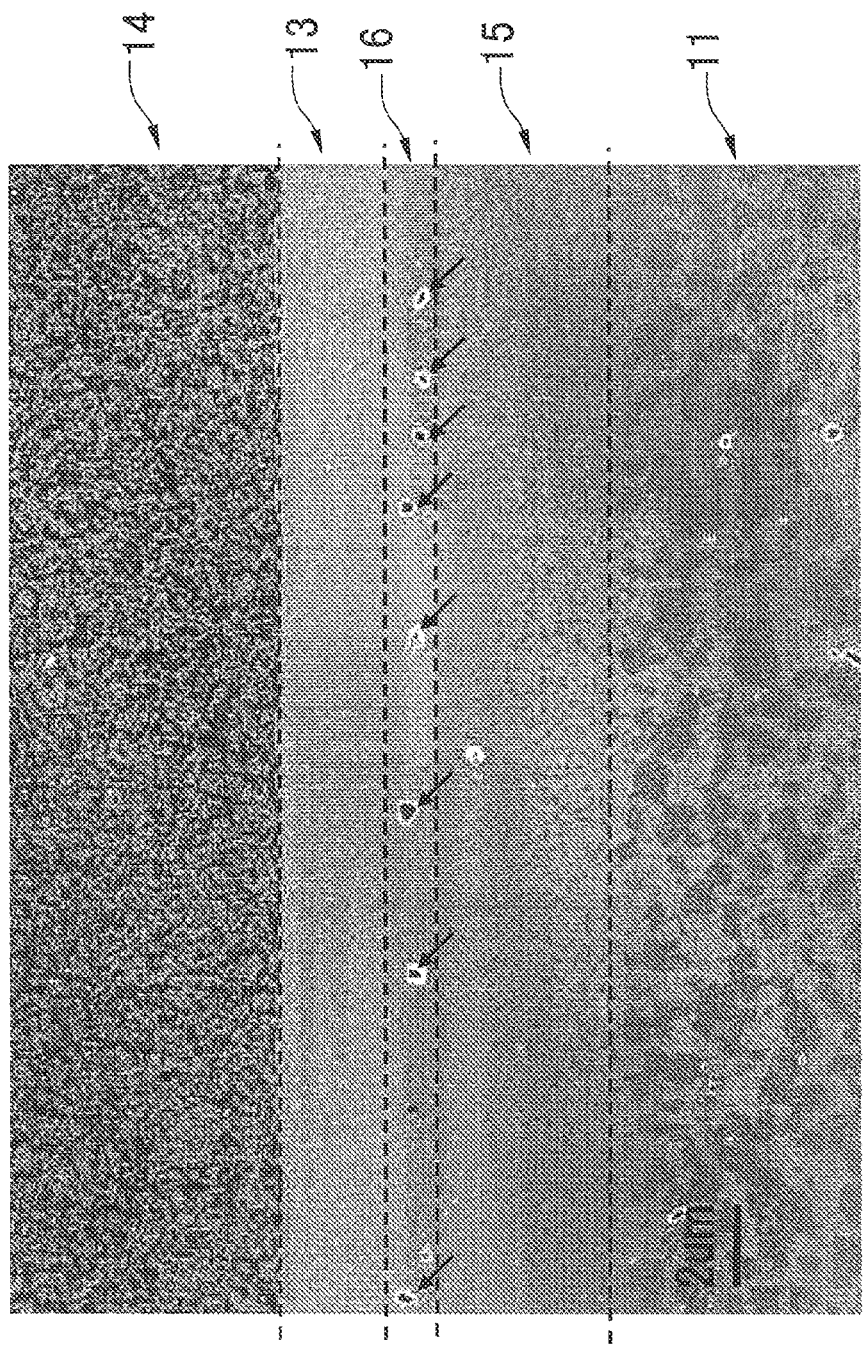
FIG. 2 is an SEM image illustrating a cross sectional view of a cell test material in the present embodiment.

More specifically, an image is obtained in 20 different fields of view in relation to positions on a single cross section using a scanning electron microscope. Use of imaging software enables specification of pores in the resulting image (in the field of vision of the microscope) and enables determination of both position and size. FIG. 2 shows an example of a cross section.

Furthermore, element mapping is performed in relation to the 20 cross sections. The element mapping is executed using FE-EPMA (a field-emission electron probe microanalyzer). The name of the apparatus that is employed is an field emission analytic electronic microscope (JXA-8500F) manufactured by JEOL Ltd.

The position at which the cerium concentration coincides with the zirconium concentration is specified as the position of the first surface 16*a* based on the resulting signal strength.

Furthermore, a position in the barrier layer that shows a cerium concentration of 85% of the maximum value is specified as the position of the second surface 16b.

The respective concentration of Gd and Y atoms is calculated based on the signal intensity.

Figure 3:
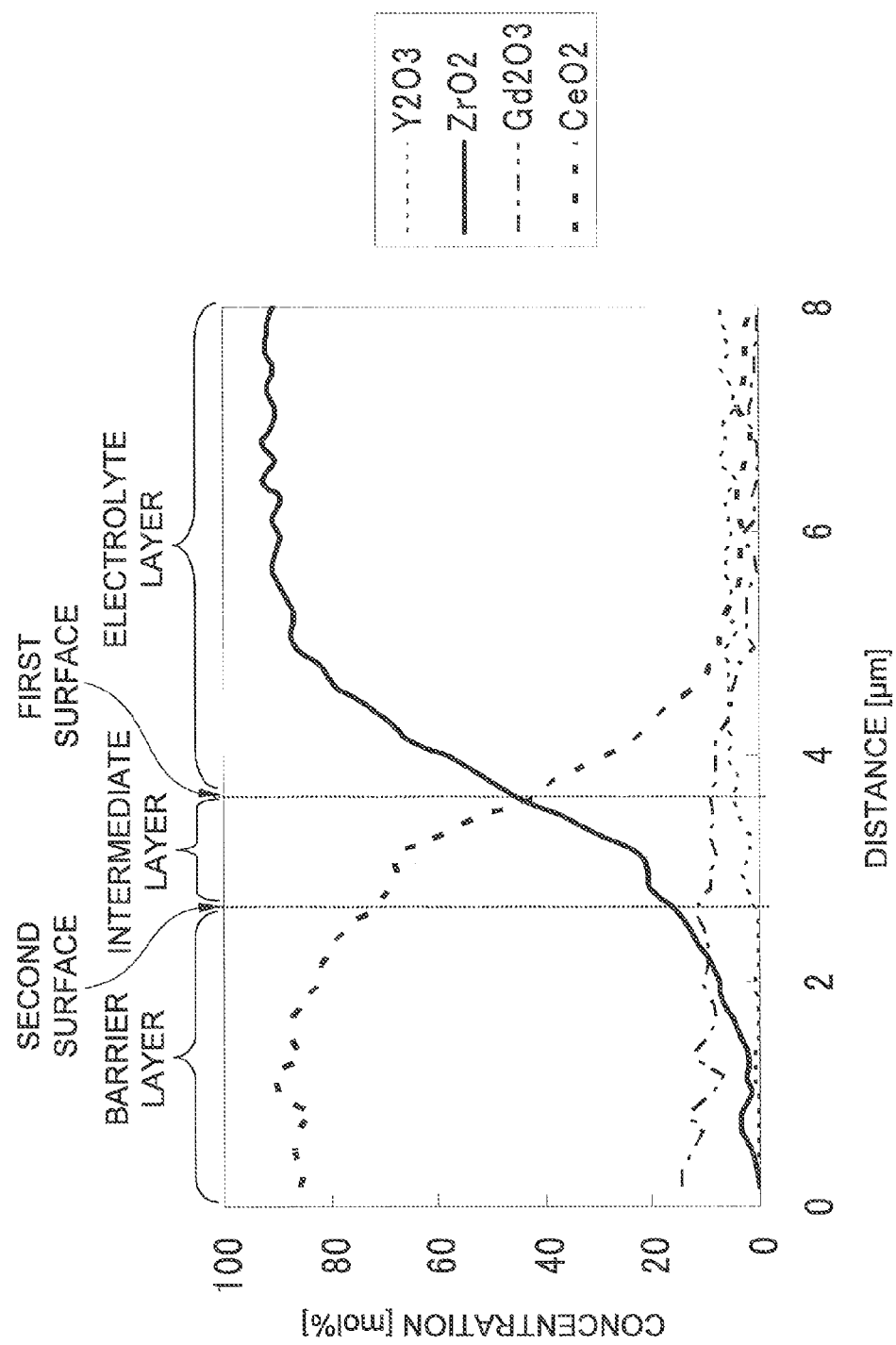
FIG. 3 is a graph illustrating the concentration distribution of each component illustrated in FIG. 2.

Furthermore, the concentration of $CeO_2$, $Gd_2O_3$, $ZrO_2$ and $Y_2O_3$ is calculated from the atomic concentration. The concentration on each line, that is to say, the concentration at a position that differs with respect to the thickness direction (concentration distribution) is calculated. FIG. 3 illustrates an example of the concentration distribution is the distribution of each substance obtained in the field of vision in FIG. 2. In FIG. 3, the horizontal axis shows the distance from the proximity to the upper surface of the barrier layer 13, and the vertical axis illustrates the concentration of the substance at each position.

C. Thermal Cycle Test

The reliability of the contact interface was evaluated through a thermal cycle test of the cell test material which is the stacked body configured from different materials. The testing sequence will be described below.

A cell test material was prepared in the sequence that is the same as A above. However, the cathode was not formed. Thermal cycle test (100 times continuously) is performed in which the cell test material is heated under a condition of 700° C. for 5 minutes in an infrared lamp-type electrical furnace in Air, and then cooled for 20 minutes by furnace cooling.

After completion of testing, the presence or absence of film peeling in the cell test material is evaluated visually and by microscopic observation.

D. Results

As illustrated in FIG. 2, the anode 11, the barrier layer 13, the electrolyte layer 15, and the intermediate layer 16 disposed between the barrier layer 13 and the electrolyte layer 15 is observed in cross section.

A plurality of pores (indicated by the arrows in FIG. 2) is included in the intermediate layer 16. The major-axis diameter of the pores 16c is 0.05 μm-1 μm, and the average value is 0.3 μm.

When the number of pores included in the intermediate layer 16 in 20 fields of vision is measured, an average number of four pores per 10 μm length was identified in a direction that is parallel to the barrier-impact interface. The average of the pore ratio of the intermediate layer 16 is 10%.

Almost no pores are observed in the barrier layer 13 and the electrolyte layer 15. The pore ratio of the barrier layer 13 is 2%, and the pore ratio of the electrolyte layer is 0.2%.

That is to say, although pores are evident in the intermediate layer 16, the barrier layer 13 is dense. This configuration in the barrier layer 13 imparts low electrical resistance and a superior barrier function.

As illustrated in FIG. 3, the scope of the composition of the intermediate layer 16 within the field of vision as illustrated in FIG. 2 is 0 mol %<$Y_2O_3$≦5 mol %, 13 mol %<$ZrO_2$≦46 mol %, 7 mol %<$Gd_2O_3$≦12 mol %, and 46 mol %<$CeO_2$≦77 mol %.

As illustrated in FIG. 3, the intermediate layer 16 includes a concentration gradient for components included in the barrier layer 13, and a concentration gradient in particular of $CeO_2$. In the intermediate layer 16, the $CeO_2$ concentration shows a substantially monotonic decrease from the second surface 16b to the first surface 16a. For example, in FIG. 3, the $CeO_2$ concentration in the intermediate layer 16 shows 46 mol % that is the minimum value in the first surface 16a, and shows 77 mol % that is the maximum value in the second surface 16b.

The intermediate layer 16 includes a concentration gradient for components included in the electrolyte layer 15, and a concentration gradient in particular of $ZrO_2$. In the intermediate layer 16, the $ZrO_2$ concentration shows a substantially monotonic increase from the second surface 16b to the first surface 16a. For example, in FIG. 3, the $ZrO_2$ concentration in the intermediate layer 16 shows 46 mol % that is the maximum value in the first surface 16a, and shows 13 mol % that is the minimum value in the second surface 16b.

The thickness of the intermediate layer 16 in the 20 fields of vision is 1.0-1.5 μm, and the average value of the thickness of the intermediate layer 16 is 1.2 μm.

The average value of the concentration of $Y_2O_3$ in the intermediate layer 16 is 3.5 mol %, and the average value of the concentration of $ZrO_2$ is 30 mol %. The average value of the concentration of $Gd_2O_3$ is 6.5 mol %, and the average value of the concentration of $CeO_2$ is 60 mol %.

When the average value of the upper limit and the lower limit of the concentration of each component in the intermediate layer 16 is calculated in the 20 fields of vision, 0 mol %<$Y_2O_3$≦5 mol %, 10 mol %<$ZrO_2$≦45 mol %, 5 mol %<$Gd_2O_3$≦15 mol %, and 45 mol %<$CeO_2$≦80 mol %.

When the average value of the upper limit and the lower limit of the concentration of $CeO_2$ and the concentration of $Gd_2O_3$ in the barrier layer 13 is calculated, 9.5 mol %<$Gd_2O_3$≦10.7 mol %, and 89 mol %<$CeO_2$≦91 mol %. When the average value of the upper limit and the lower limit of the concentration of $Y_2O_3$ and the concentration of $ZrO_2$ in the electrolyte layer 15 is calculated, 2.2 mol %<$Y_2O_3$≦3.9 mol % and 96 mol %<$ZrO_2$≦98 mol %.

In this manner, in the intermediate layer 16, the maximum value of the $CeO_2$ concentration is approximately twice the minimum value of the $CeO_2$ concentration, and the maximum value of the $ZrO_2$ concentration is approximately five times the minimum value of the $ZrO_2$ concentration. In contrast, in the barrier layer 13, the maximum value of the $CeO_2$ concentration is approximately 1.02 the minimum value of the $CeO_2$ concentration. Furthermore, the maximum value of the $ZrO_2$ concentration in the electrolyte layer 15 is approximately 1.02 the minimum value of the $ZrO_2$ concentration. In other words, in comparison to the intermediate layer 16, the barrier layer 13 and the electrolyte layer 15 have a smaller fluctuation ratio for the concentration depending on the position in a thickness direction. In other words, the composition of the overall layer in the barrier layer 13 and the electrolyte layer 15 shows higher uniformity.

As a result of the thermal cycle test, the peeling of the barrier layer 13 from the electrolyte layer 15 is not observed. In other words, a high quality cell is obtained that is adapted for use in a fuel cell.

Although the results described above are related to only one of the cell testing material obtained under the above manufacturing conditions, the same results are obtained in relation to other cell testing materials.

DESCRIPTION OF THE REFERENCE NUMERALS

1 FUEL CELL
10 FUEL CELL STACK
11 ANODE
13 BARRIER LAYER
14 CATHODE
15 ELECTROLYTE LAYER
16 INTERMEDIATE LAYER
4 CURRENT COLLECTING MEMBER
41 CONDUCTIVE CONNECTION PORTION

What is claimed is:

1. A fuel cell comprising:
   an anode,
   a cathode,
   a solid electrolyte layer including zirconium and provided between the anode and the cathode,
   a barrier layer including cerium and provided between the solid electrolyte layer and the cathode, wherein the composition of the barrier layer is different from the composition of the solid electrolyte layer, and
   an intermediate layer including zirconium and cerium, and having a first surface facing the solid electrolyte layer, a second surface facing the barrier layer, and pores, a pore ratio of the intermediate layer being higher than a pore ratio of the barrier layer.

2. The fuel cell according to claim 1, wherein the cerium concentration in the intermediate layer is no more than 90% of a cerium concentration in the barrier layer.

3. The fuel cell according to claim 1, wherein the intermediate layer has a maximum cerium concentration in proximity to the second surface, and a minimum cerium concentration in proximity to the first surface.

4. The fuel cell according to claim 1, wherein the ratio of the zirconium concentration in the intermediate layer to the zirconium concentration in the solid electrolyte layer is no more than 0.5.

5. The fuel cell according to claim 1, wherein the pore ratio of the intermediate layer is at least 1% and no more than 15%.

6. The fuel cell according to claim 1, wherein the distance from the first surface to the second surface is at least 0.5 µm.

7. The fuel cell according to claim 1, wherein the distance from the first surface to the second surface is no more than 10 µm.

8. The fuel cell according to claim 1, wherein the pore ratio of the barrier layer is no more than 10%.

9. The fuel cell according to claim 1, wherein the major-axis diameter of each the pores in the intermediate layer is no more than 1 µm.

10. The fuel cell according to claim 1, wherein the number of pores per 10 µm length in a vertical direction with respect to the thickness direction in the intermediate layer is no more than 5.

11. The fuel cell according to claim 1, wherein the pores of the intermediate layer includes a closed pore.

12. The fuel cell according to claim 1, wherein a coefficient of thermal expansion of the intermediate layer has a value between a coefficient of thermal expansion of the solid electrolyte layer and a coefficient of thermal expansion of the barrier layer.

13. The fuel cell according to claim 1, wherein the solid electrolyte layer, the intermediate layer and the barrier layer are co-fired.

* * * * *

UNITED STATES PATENT AND TRADEMARK OFFICE
CERTIFICATE OF CORRECTION

PATENT NO. : 8,349,511 B2
APPLICATION NO. : 13/159796
DATED : January 8, 2013
INVENTOR(S) : Ayano Kobayashi, Shinji Fujisaki and Makoto Ohmori It is certified that error appears in the above-identified patent and that said Letters Patent is hereby corrected as shown below:

Column 6, line 65: Please delete "is"

Signed and Sealed this
Second Day of April, 2013

Teresa Stanek Rea
*Acting Director of the United States Patent and Trademark Office*